Patented Jan. 26, 1954

2,667,512

UNITED STATES PATENT OFFICE 2,667,512

HALOGENATED CYCLIC KETONES AND
METHOD FOR THEIR PRODUCTION

David E. Adelson, Berkeley, Calif., assignor to
Shell Development Company, San Francisco,
Calif., a corporation of Delaware No Drawing. Application October 29, 1949,
Serial No. 124,483

7 Claims. (Cl. 260—586)

This invention relates to the provision of novel compounds formed on the reaction of aliphatically unsaturated, cyclic ketones with polyhalogenated organic materials, as well as to the method by which compounds are produced. These products are valuable lubricant additives, as disclosed in copending application Serial No. 793,329, filed December 22, 1947, now U. S. Patent No. 2,569,122, of which this application is a continuation-in-part, and many of them are useful for other purposes as well.

The compounds of this invention are formed by heating one or more aliphatically unsaturated, cyclic ketones with a polyhalogenated organic reactant in the presence of a peroxide catalyst. The resulting products vary in character from thick, viscous liquids, to resinous solids, and all contain a substantial percentage of halogen.

The cyclic ketone reactant is one wherein the carbonyl carbon atom is embraced in the ring and wherein a double bond of aliphatic character exists between at least one pair of adjacent carbon atoms which may either form a part of said ring or of a group attached thereto. Representative ketones of this class, any one or combination of which may be employed for reaction with a polyhalogenated organic compound, are:

Cyclobutenone
Cyclopentenone
Quinone
o-Quinone
Isophorone
Cycloheptenone
Cyclohexenone
Pulegone
Carvone
Naphthoquinone
Naphthalenone
3-vinylcyclohexanone
4-allylcyclohexanone
5-phenyl-3-cyclohexen-1-one
3-methylcyclohexen-2-one
3,3,5-trimethylcyclohexen-2-one However, a preferred class of ketones for use in the present invention comprises those wherein an olefinic linkage exists between one or more pairs of carbon atoms in the cycle and which contain at least 12 carbon atoms in the molecule. Representative ketones falling within this preferred class are 3,5,5-triethylcyclohexenone, 3,5,5-triisopropylcyclohexenone, dibenzalcyclohexenone, angustione, triquinoyl, and isophorone bottoms (the nature of which will be explained in greater detail below). Generally speaking, higher ketones of this preferred type may readily be obtained from the catalytic condensation of acetone either with itself or with some other compound condensable therewith to form a higher ketone, examples of such other condensable compounds being the lower alcohols, as isopropyl, isobutyl or isoamyl alcohol. Thus, representative higher ketones may be prepared by condensing acetone in the presence of strong (30 to 60%) caustic at temperatures ranging from about 130 to 170° C. and at pressures of from 300 to 500 P. S. I., for example. Under favorable circumstances this condensation is productive, in the main, of isophorone, though at the same time various $C_{12}$ and higher unsaturated ketones are produced which remain as bottoms after the isophorone and the other lower boiling constituents have been distilled off. Such bottoms, termed "crude isophorone bottoms," may either be reacted as such with the organic polyhalogenated compound, or they may first be fractionally distilled into various components which may then be used in the reaction either individually or in combination. The $C_{12}$ fraction ($C_{12}H_{18}O$) boils within the range of approximately 112 to 123° C. (10 mm. Hg), a mixture of $C_{12}$ and $C_{15}$ ($C_{15}H_{22}O$) ketones boils from about 123 to about 142° C. (10 mm. Hg), whereas the $C_{15}$ ketones themselves boil within the range of about 140 to 175° C. (10 mm. Hg). A more preferred mixture of unsaturated ketones, termed "topped, crude, isophorone bottoms" is that which remains in the still when crude isophorone bottoms are distilled until a still head temperature of approximately 140° C. (10 mm. Hg) is reached, the residue comprising, in the main, $C_{12}$ and higher unsaturated ketones. Isophorone bottoms may also be subjected to hydrolysis with dilute caustic after which they are separated from the acetone and isophorone formed during the hydrolysis step. The hydrolyzed bottoms, which can then be filtered or otherwise purified, may be reacted as such with the organic, polyhalogenated material, or they may first be fractionated in the manner described above and then reacted. As was the case with the crude bottoms, a more preferred mixture of ketones is that remaining on distilling off the components of the hydrolyzed bottoms mixtures which boil below 140° C. (10 mm. Hg). This residue is referred to herein as "topped, crude, hydrolyzed, isophorone bottoms" and is generally similar in structure to the topped, crude, isophorone bottoms described above.

The term "isophorone bottoms," as employed herein, is intended to include all cyclic ketones produced according to the conditions of the foregoing paragraph which contain at least 12 carbon atoms in the molecule, whether topped or untopped, and whether hydrolyzed or unhydrolyzed, and which in general have the structural configuration of isophorone or a condensation product thereof. All of said isophorone bottom compounds are olefinically unsaturated in their nuclear portion.

Other cyclic ketones which are olefinically unsaturated in their nucleus and contain 12 or more carbon atoms in the molecule, and which may be used in the present invention, are prepared by the alkaline condensation of mesityl oxide. The latter compound (which may be prepared by condensing acetone into diacetone alcohol in the presence of soda lime and thereafter subjecting the alcohol to acid-catalyzed dehydration) condenses in the presence of strong (e. g. 30 to 60%) caustic and at elevated temperatures and pressures to form, in the main, $C_{12}C_{18}O$, $C_{18}C_{26}O$ and higher molecular ketone units. The desired $C_{12}$ and higher ketones may be obtained from the mesityl oxide condensation product by topping the same (i. e., distilling off the lower boiling fractions) until a still head temperature of about 95° C. (4 mm. Hg) is reached. The residue (bottoms in the still) may then be used as such or it may be still further topped to a still head temperature of 160° (4 mm. Hg), at which point the main portion of the $C_{18}$ ketones begins to distill.

The polyhalogenated organic reactant may comprise any organic compound wherein at least 2 and preferably 3 or more halogen atoms are attached to a single carbon atom. Representative reactants of this variety are, for example, polyhalogenated alkanes such as carbon tetrachloride, chloroform, methylene chloride, carbon tetrabromide, bromoform, methylene bromide, iodoform, methylene chloroiodide, hexachloroethane, di- and trichloroethane, and polyhalogenated fatty acids in which the halo radicals are preferably attached in the alpha and/or beta position with respect to the carboxyl radical, as, for example, dichloroacetic acid, trichloroacetic acid, alpha,alpha-dichloropropionic acid, alpha,alpha,beta,beta - tetrachloropropionic acid, alpha,alpha-dichlorobutyric acid, alpha,alpha,-beta-trichlorobutyric acid, phenyldichloroacetic acid, dibromoacetic acid, tribromoacetic acid, alpha,alpha - dichloropentanoic acid, alpha,-alpha-dibromopentanoic acid, diiodoacetic acid, triiodoacetic acid, beta,beta - dibromopropionic acid, alpha,alpha-dichlorocaprylic acid, etc. If desired, two or more of such compounds may be used in conjunction during the reaction with ketone.

As has been mentioned above, the reaction products of the present invention are formed in the presence of a peroxide catalyst. The nature of the peroxide compound is not critical and, if desired, two or more different peroxides may be used in any given reaction. Representative peroxides are:

Hydrogen peroxide
Benzoyl peroxide
Lauroyl peroxide
Tetraline peroxide
Urea peroxide
Butyryl peroxide
Diethyl peroxide
Di-tert-butyl peroxide
Diacyl peroxide
Acetyl benzoyl peroxide
Propionyl peroxide
Cyclohexanone peroxide
Ascaridole
Alkali and alkaline earth metal peroxides In carrying out the process of this invention, the respective ketonic and halogenated reactants are combined and admixed with the desired peroxide additive in any suitable type of apparatus, the process being carried out in a batchwise, intermittent or continuous manner. A solvent may or may not be used, as desired. Equi-molar proportions of the respective reactants may be used, and the ketonic reactant may even be present in slight excess. However, it is preferred that there be from about 1.5 to 5 moles of the polyhalogenated reactant for each mole of ketone present. The peroxide additive, in turn, should be present in an amount which may vary from about 0.01 to 0.2 mole per cent. Any elevated temperature may be used in the execution of the process of this invention, but in order to provide a comparatively rapid reaction rate and to increase the yield, the temperature is preferably maintained above about 100° C., the conventional practice being to reflux the reaction mixture during the reaction interval. This interval is subject to considerable variation, and while some reaction takes place after only a few minutes heating, extensive reaction requires use of heating periods of one or more hours duration. The preferred practice is to reflux the reaction mixture for from about 2 to 30 hours, using either atmospheric, subatmospheric or superatmospheric pressures, as desired.

The reaction mixture remaining at the conclusion of the heating interval contains the novel halogenated cyclic ketone product and usually some excess of either one or both reactants. These reaction mixtures are themselves novel compositions having important uses, they being employed, for example, as insecticidal and fungicidal compositions and as lubricant additives. However, it is preferred to remove from the composition, as by distillation, washing, or otherwise, any excess of the polyhalogenated reactant which may still be present, such removal considerably enhancing the utility of the composition as a lubricant additive. On the other hand, for this as well as other purposes, it appears immaterial that the composition may still contain substantial amounts of the ketone reactant. In many cases it is advantageous to leave this residual ketone in the composition since it here acts as a solvent or partial solvent for the halogenated reaction product per se. These various compositions, which contain excess reactant(s), are normally dark in color and vary in viscosity from heavy, though pourable, liquids to those of a highly viscous nature. If desired, any excess of the ketone reactant present may also be removed from the composition, as by distillation (preferably conducted under vacuo) or by the technique of chromatographic separation. In the latter method, the composition is absorbed on a suitable material, as alumina, silica, or the like, after which it is treated first with a solvent of low polarity, as pentane or cyclohexane, to remove the unreacted ketone and then with a material of higher polarity, as methyl or ethyl alcohol, which in turn removes the halogenated reaction product per se. These latter reaction products are dark in color and most are of a solid, resinous character, though some are liquid at room temperature. All compositions of this invention, whether freed of halogenated and/or ketonic reactants or not, are soluble in ketones, as acetone, methyl ethyl ketone and di-isobutyl ketone; in hydrocarbons, as benzene, xylene, toluene or octane; in ethers, as dioxane, diethyl ether, or di-isopropyl ether; and in alcohols, particularly higher alcohols such as decanol and the like. They are insoluble in water. As has been noted above, these compositions all form excellent lubricant additives and have a number of other valuable uses as well.

The following examples illustrate the present invention in various of its embodiments:

*Example I*

A mixture made up of 310 grams (1 mole) of topped, crude, isophorone bottoms (composed of C$_{16}$ and higher ketones obtained by topping bottoms from the isophorone synthesis to a still head temperature of 140° C. at 10 mm. Hg.), 615 grams carbon tetrachloride (4 moles) and 9.7 grams of benzoyl peroxide (0.04 mole) is refluxed for 12 hours, after which the excess carbon tetrachloride is distilled off. The residue is a dark, highly viscous liquid having a chlorine content of approximately 9.7% and containing approximately 61% of unreacted isophorone bottoms. In two other similar operations the reflux period is extended in the one case to 24 hours and in the other to 72 hours. The products obtained from the latter two operations, while containing 15.4 and 13.5% chlorine and 38 and 46% unreacted ketone bottoms, respectively, have essentially the same physical and chemical properties as does the product prepared using the 12 hour reflux period. All these compositions proved capable of imparting extreme pressure qualities to lubricating oils.

*Example II*

The operations of this example are conducted in the same manner as those described in Example I above except that here 477 grams (4 moles) of chloroform are substituted for the carbon tetrachloride reactant. While the products obtained at the end of 12, 24 and 72 hour refluxing periods contain 1.2, 1.6 and 2.4% chlorine, respectively, their other physical and chemical properties are essentially the same as those of the products described in Example I, and all are excellent lubricant additives.

*Example III*

One mole of the topped, crude, isophorone bottoms material of Example I is refluxed with 4 moles of dichloroacetic acid in the presence of 0.05 mole ditertiary-butyl peroxide for a period of 24 hours. The resulting reaction mixture is then dissolved in a non-aromatic hydrocarbon solvent having a boiling point range of between about 164 and 233° F., after which the solution is washed with water in order to remove unreacted dichloroacetic acid. On distilling off the solvent from the resulting solution, there remains a dark, viscous liquid which contains approximately 12% chlorine. When this process is repeated using an equivalent amount of trichloroacetic acid in the one case and of beta,beta-dichloropropionic acid in the other, in place of the dichloroacetic acid reactant, there are obtained products whose properties are very similar to those of the material obtained by reacting the isophorone bottoms with the dichloroacetic acid, the chief difference being that the material obtained through use of tichloroacetic acid contains a somewhat higher percentage of chlorine (ca. 15%).

*Example IV*

The compositions obtained in the foregoing examples after removal of the polyhalogenated reactant, are distilled under vacuo until still head temperatures of approximately 200° C. (10 mm. Hg.) are reached. The residues obtained in this manner, which are substantially free of unreacted ketone, solidify on cooling to dark, resinous solids which contain from about 20 to 25% chlorine. All are soluble in the various hydrocarbon, ketone, alcohol and ether solvents, and are insoluble in water. Again, all proved to be extremely useful lubricant additives.

*Example V*

One mole of isophorone is refluxed for 12 hours in the presence of benzoyl peroxide, in the one case with 4 moles of carbon tetrachloride and in the other case with a like amount of chloroform. In both cases, after distilling off the excess of polyhalogenated reactant, there are obtained products having a chlorine content of 5.1%. These products, while dark in color, are somewhat less viscous than are those obtained using isophorone bottoms as the starting material.

The various percentages expressed herein are on a weight basis, unless otherwise indicated.

The invention claimed is:

1. The method comprising heating, at a temperature above 100° C. for at least one hour, a reaction mixture comprising (a) a cyclic, olefinically unsaturated ketone reactant of the type wherein the carbonyl carbon atom is embraced in the cycle, (b) a reactant selected from the group consisting of polyhalogenated alkanes and polyhalogenated fatty acids having at least two halogen atoms attached to a single carbon atom, and (c) from about 0.01 to 0.2 mole percent of a peroxide catalyst, said reactants being employed in the ratio of from about 1 to 5 moles of the polyhalogenated compound for each mole of the ketone.

2. A composition produced by the method of claim 1.

3. The method comprising heating, at a temperature above 100° C. for at least one hour, a reaction mixture comprising, (a) isophorone bottoms, (b) a reactant selected from the group consisting of polyhalogenated alkanes and polyhalogenated fatty acids having at least two halogen atoms attached to a single carbon atom, and (c) from about 0.01 to 0.2 mole percent of a peroxide catalyst, the reactants being employed in the ratio of from 1 to 5 moles of the polyhalogenated compound for each mole of the isophorone bottoms.

4. The novel composition of matter obtained by heating carbon tetrachloride with isophorone at a temperature above 100° C. for at least one hour in the presence of from 0.01 to 0.2 mole percent of a peroxide catalyst, said reactants being employed in the ratio of from 1 to 5 moles of carbon tetrachloride for each mole of isophorone.

5. The novel composition of matter obtained by heating, at a temperature above 100° C. for at least one hour, isophorone bottoms with carbon tetrachloride in the presence of from 0.01 to 0.2 mole percent of a peroxide catalyst, said reactants being employed in the ratio of from 1 to 5 moles of carbon tetrachloride for each mole of isophorone bottoms.

6. The novel composition of matter obtained by heating, at a temperature above 100° C. for at least one hour, isophorone bottoms with chloroform in the presence of from 0.01 to 0.2 mole percent of a peroxide catalyst, said reactants being employed in the ratio of from 1 to 5 moles of chloroform for each mole of isophorone bottoms.

7. The novel composition of matter obtained by heating, at a temperature above 100° C. for at least one hour, isophorone bottoms with trichloroacetic acid in the presence of from 0.01 to 0.2 mole percent of a peroxide catalyst, said reactants being employed in the ratio of from 1 to 5 moles of trichloroacetic acid for each mole of isophorone bottoms.

DAVID E. ADELSON.

References Cited in the file of this patent

UNITED STATES PATENTS

| Number | Name | Date |
| --- | --- | --- |
| 2,222,357 | Wolfe | Nov. 19, 1940 |
| 2,380,009 | Arnold et al. | July 10, 1945 |
| 2,386,447 | Dreisbach | Oct. 9, 1945 |
| 2,415,796 | Lichty | Feb. 11, 1947 |

OTHER REFERENCES

Prill, J. Am. Chem. Soc., vol. 69 pages 62–63 (1947).